(12) United States Patent
Matcovici et al.

(10) Patent No.: US 12,272,122 B1
(45) Date of Patent: Apr. 8, 2025

(54) TECHNIQUES FOR OPTIMIZING OBJECT DETECTION FRAMEWORKS

(71) Applicant: Amazon Technologies, Inc., Seattle, WA (US)

(72) Inventors: Stefan Matcovici, Iasi (RO); Alin-Ionut Popa, Bucharest (RO); Daniel Voinea, Vlădiceasca (RO)

(73) Assignee: Amazon Technologies, Inc., Seattle, WA (US)

( * ) Notice: Subject to any disclaimer, the term of this patent is extended or adjusted under 35 U.S.C. 154(b) by 397 days.

(21) Appl. No.: 17/886,271

(22) Filed: Aug. 11, 2022

(51) Int. Cl.
| | | |
|---|---|---|
| *G06V 10/774* | (2022.01) | |
| *G06V 10/22* | (2022.01) | |
| *G06V 10/74* | (2022.01) | |
| *G06V 10/75* | (2022.01) | |
| *G06V 10/764* | (2022.01) | |
| *G06V 10/82* | (2022.01) | |

(52) U.S. Cl.
CPC ............ *G06V 10/774* (2022.01); *G06V 10/22* (2022.01); *G06V 10/759* (2022.01); *G06V 10/761* (2022.01); *G06V 10/764* (2022.01); *G06V 10/82* (2022.01)

(58) Field of Classification Search
CPC .... G06V 10/774; G06V 10/22; G06V 10/759; G06V 10/761; G06V 10/764; G06V 10/82
See application file for complete search history.

(56) References Cited

U.S. PATENT DOCUMENTS

| | | | |
|---|---|---|---|
| 2018/0260793 A1* | 9/2018 | Li ........................ | G06Q 40/08 |
| 2021/0142097 A1* | 5/2021 | Zheng .................. | G06V 10/761 |

OTHER PUBLICATIONS

Gongjie Zhang et al., "Meta-DETR: Image-Level Few-Shot Object Detection with Inter-Class Correlation Exploitation", pub.Sep. 20, 2021, (Year: 2021).*
Qiao, et al., "DeFRCN: Decoupled Faster R-CNN for Few-Shot Object Detection", Megvii Technology, retrieved from https://github.com/er-muyue/DeFRCN.
Detectron2 Beginner's Tutorial, Detectron2 Tutorial.ipynb—Colaboratory, retrieved from https://colab.research.google.com/drive/16jcaJoc6bCFAQ96jDe2HwtXj7BMD_-m5#scrollTo=PlbAM2pv-urF&printMode=true, on Aug. 11, 2022.
(Continued)

*Primary Examiner* — Mekonen T Bekele
(74) *Attorney, Agent, or Firm* — Kilpatrick Townsend & Stockton LLP

(57) ABSTRACT

Systems, devices, and methods are described herein for improving object detection frameworks. Proposed regions can be used to identify similar images from a novel image set. Once identified, a weighted average of the feature representations of the similar images and/or a probability distribution of the classification labels for those images can be generated. The weighted average of the feature representations and/or the probability distribution can be used to steer the predicted classification confidence and/or predicted bounding box coordinates of the object detection framework. The disclosed techniques can be easily integrated with the object detect framework to improve the accuracy of its predictions without adding additional trainable parameters so as to refrain from adding complexity to the learning process.

20 Claims, 8 Drawing Sheets

(56) References Cited

OTHER PUBLICATIONS

DETReg: Unsupervised Pretraining with Region Priors for Object Detection, Bar, et al., retrieved from https://amirbar.net/detreg (Jun. 8, 2021).
Dual-Awareness Attention for Few-Shot Object Detection, Chen, et al., IEEE Transactions On Multimedia, vol. 23, 2021 (Sep. 16, 2021).
Few-shot Object Detection via Feature Reweighting, Kang, et al., retrieved from arXiv:1812.01866v2 [cs.CV], (Oct. 21, 2019).
Frustratingly Simple Few-Shot Object Detection, Wang, et al., retrieved from arXiv:2003.06957v1 [cs.CV] (Mar. 16, 2020).
Meta-DETR: Image-Level Few-Shot Object Detection with Inter-Class Correlation Exploitation, Zhang, et al., retrieved from arXiv:2103.11731v3 [cs.CV] (Sep. 20, 2021).

\* cited by examiner

TECHNIQUES FOR OPTIMIZING OBJECT DETECTION FRAMEWORKS

BACKGROUND

Few-shot learning has attracted significant scientific interest due to its applicability to visual tasks such as object detection. In some object detection scenarios, certain object classes are densely represented while others are heavily underrepresented. This dichotomy has motivated the emergence of few-shot object detection (FSOD) frameworks that aim to detect novel object categories using very few training samples (e.g., under 30 training samples of the particular object category). Current FSOD methodologies can be improved to provide more accurate object detection functionality despite a relatively small number of novel training samples.

BRIEF DESCRIPTION OF THE DRAWINGS

Various embodiments in accordance with the present disclosure will be described with reference to the drawings, in which.

DETAILED DESCRIPTION

Figure 1:
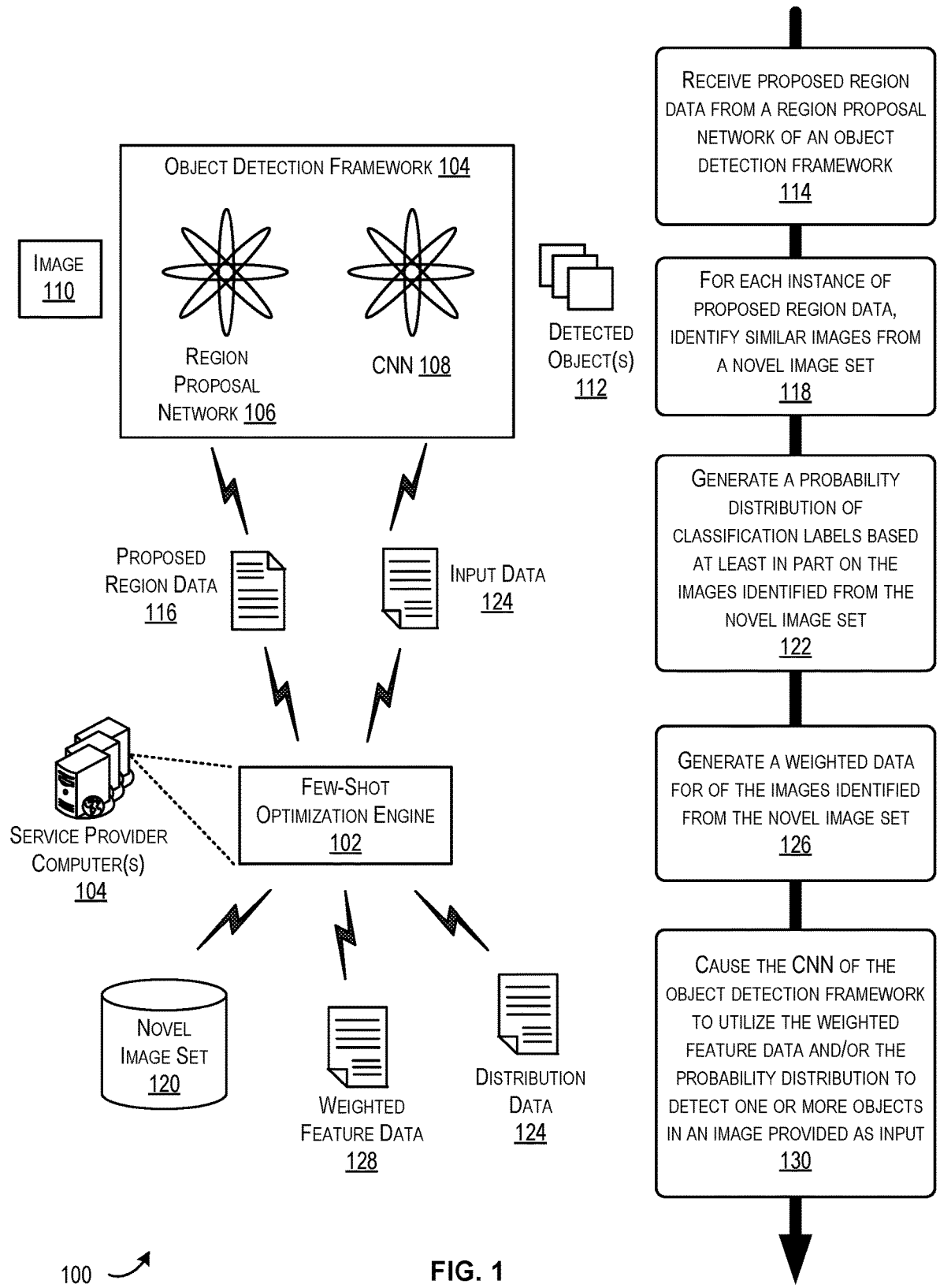
FIG. 1 illustrates an example flow for optimizing an object detection framework, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Collecting large scale datasets can be labor intensive and involve extensive human effort or sensory equipment for measurement-based annotations (e.g., complex motion capture systems for 3D pose annotations). However, not all problems are scalable or approachable through such data acquisition mechanics. Additionally, for some use cases, there may be sparse information representations where data is scarce and difficult to obtain even with abundant resources. Object detection may be one example use case in which this is true. In object detection, the natural distribution of searched objects is usually long-tail in the sense that certain object classes are densely represented and as the category list increases, other categories become heavily underrepresented. Therefore, it is advantageous to be able to fine tune an object detector to detect novel object categories, without requiring a large number of sample images for those categories. Few shot object detection frameworks have emerged to address this need. A FSOD aims to detect unseen (novel) object categories using very few training samples (i.e., less than 30 training samples).

One of the major limitations of conventional FSOD methodology is that it does not fully exploit the provided few-shot image space. Instead, the novel training samples are analyzed one batch at a time, without taking into consideration the entire data context.

One example learning strategy for a FSOD includes of a two stage fine-tunning approach. The first stage involves training an object detector for the base object categories via a large train data corpus where they are densely represented. As a result of the learning process, the feature representation retrieved from the model should accommodate in a generic fashion the patterns and visual appearance encoded within the training data for the base categories. The second stage involves adapting the trained detector to novel object categories which are heavily underrepresented. This task involves a collection of challenges such as (i) covariance shift between the distributions of novel and base classes and (ii) a high ambiguity degree between the visual representation of novel and base classes requiring constraining mechanisms to make the embeddings of novel classes discriminative enough.

Techniques described herein are directed to optimizing two-stage object detection frameworks configured for few-shot learning. These frameworks are referred to herein as a "few shot object detector" (FSOD) of "two stage FSOD," for brevity. The disclosed techniques improve the two-stage FSOD incorporate an aggregated representation of the entire input space during inference and training. One example two-stage FSOD includes a region-based convolutional neural network (R-CNN). The R-CNN includes convolutional neural network (CNN) structure which encodes the image information in a generic manner to generate image feature embeddings. Next, the encoded information is transformed to a list of class-agnostic candidate objects (e.g., region proposals) using a region proposal network (RPN) (e.g., a neural network previously trained to generate region proposals from an image). Lastly, the objects from the region proposals are pooled to region-of interest (ROI) features. That is the region proposal objects are combined with the image feature representations generated by the encoding CNN to generate the ROI features. These ROI features may be fed to a second neural network that includes a classifier and a regressor head. A refined list of objects defined by class labels and bounding box coordinates is obtained from the classifier and the regressor head, respectively. A R-CNN is utilized in the examples herein for illustrative purposes only and is not intended to limit the scope of this disclosure. It should be appreciated that any other candidate-based object detection framework can be similarly optimized.

The techniques disclosed herein include obtaining a number of region proposals (e.g., region proposals generated by the RPN of the FSOD). A set of novel images may be obtained. The set of novel images may be associated with include supervised information (e.g., known classification labels and/or bounding box coordinates for objects that appear in the novel images). The classification labels for the novel images may be different from the base classification labels utilized to train the classifier of the R-CNN (or based classification labels that will be used to train the classifier of the R-CNN). In some embodiments, an aggregated representation of the entire input space may be incorporated within the two stage FSOD during inference and training. The disclosed techniques leverage a k-nearest neighbor (kNN) feature weighting technique operating on region proposal embeddings that are fed afterwards to the classifier and regressor, respectively. By way of example, a weighted aggregated feature representation may be calculated for similar images identified from the novel image set. These similar images may be novel images with features that are identified as being similar to features of a given region proposal. In some embodiments, a probability distribution may be generated from the classification labels associated with the similar novel images. Any suitable combination of the weighted aggregated feature representation and/or the probability distribution may be utilized during training time and/or during inference time to improve the output provided by the two stage FSOD framework.

For example, during training time, the weighted aggregated feature representation and/or the probability distribution may be utilized as a feature-based constraint for the object proposal classifier and/or regressor of the FSOD. During inference time, linear interpolation may be utilized between the probability distribution from the k-NN retrieved space and the object proposal classifier. In some embodiments, the aggregated feature representation of the retrieved neighbors can be added as a weighted factor to the encoding of the object proposal regressor.

The disclosed techniques can be easily incorporated within any two stage FSOD framework and provide a number of advantages. For example, utilizing the weighted average feature representations and/or probability distributions discussed herein can improve the accuracy of any two stage FSOD in detecting objects within an image. While improving the two stage FSOD, these techniques do not depend on any learnable parameters. In other words, the total number of trainable parameters of the model (including the classifier and regressor of the FSOD) remains constant. Thus, the improved accuracy through utilizing the disclosed techniques does not increase the complexity of training the FSOD.

Moving on to FIG. 1, which illustrates an example flow 100 for optimizing an object detection framework, in accordance with at least one embodiment. The few-shot optimization engine 102 depicted may perform the operations described herein to optimize the object detection framework 104. In some embodiments, the object detection framework 104 may include two neural networks. For example, the object detection framework 104 may include a region proposal network (RPN) 106 and a convolutional neural network (CNN) 108. In some cases, the RPN network 106 and the CNN 108 may share at least one convolutional layer. The RPN 106 may be previously trained to identify proposed region data identifying a region within an image. The proposed region data and a corresponding feature representation (e.g., generated from the shared convolutional layer) can be provided to the CNN 108 for classification and bounding box identification. In this manner, the object detection framework 104 may be configured to take an image (e.g., image 110) as input and detect one or more objects (e.g., detected object(s) 112) within the image. Detecting an object may include classifying the object as being associated with a classification label associated with an object type (e.g., cat, dog, tree, etc.). In some embodiments, the object detection framework 104 may identify bounding box coordinates for the detected object(s) 112. The flow 100 illustrates techniques for improving the object detection framework 104.

The flow 100 may begin at 114, where proposed region data 116 may be obtained by the few-shot optimization engine 102 from a region proposal network (e.g., RPN 106) of the object detection framework 104. Any suitable number of instances of proposed region data may be obtained corresponding to any suitable number regions proposed by RPN 106. RPN 106 may be discussed in more detail with respect to FIG. 2.

At 118, for each instance of proposed regions data, a number of similar images may be identified from a novel image set (novel image set 120). The novel image set 120 may include any suitable number of examples (e.g., less than 30 (or 40, or 20, etc.) images for each unique classification label represented in the novel image set). In some embodiments, each image of the novel image set 120 may be associated with a known classification label. In some cases, the images of the novel image set 120 may individually be associated with bounding box coordinates indicating a location, within the image, of an object corresponding to the classification label. The similar images may be identified from the novel image set 120 based at least in part on a distance measurement (e.g., a Euclidean distance between the feature representation of each novel image and a given feature representation corresponding to an instance of proposed region data).

At 122, a probability distribution (e.g., distribution data 124) of classification labels may be generated based at least in part on the similar images identified from the novel image set 120. By way of example, the number of similar images identified from the novel image set 120 that are associated with the same classification label may be divided by the total number of similar images identified to identify a value quantifying a probability that an image from the similar images identified is associated with a particular classification label. The same operations can be applied to each unique classification label associated with the similar images identified from the novel image set 120.

At 126, weighted feature data 128 (e.g., a weighted average of corresponding feature representations) for the images identified as being similar to the instant proposed region may be calculated by the few-shot optimization engine 102. In some embodiments, the probability distribution values of the probability distribution 124 generated at 122 may be utilized as the weight in computing the weighted feature data 128. That is, the higher the probability value that is associated with the classification label corresponding to a given similar image, the higher the weight applied to corresponding feature representation for the similar image.

At 130, the few-shot optimization engine 102 may execute operations to cause the CNN 108 of the object detection framework 104 to utilize the weighted feature data 128 and/or the distribution data 124 as input. By way of example, the few-shot optimization engine 102 may provide input data 132 as input to CNN 108. Input data 132 may include any suitable combination of weighted feature data 128 and distribution data 124. The CNN 108 may utilize the weighted feature data 128 and/or the distribution data 124 to detect the detected object(s) 112.

Figure 2:
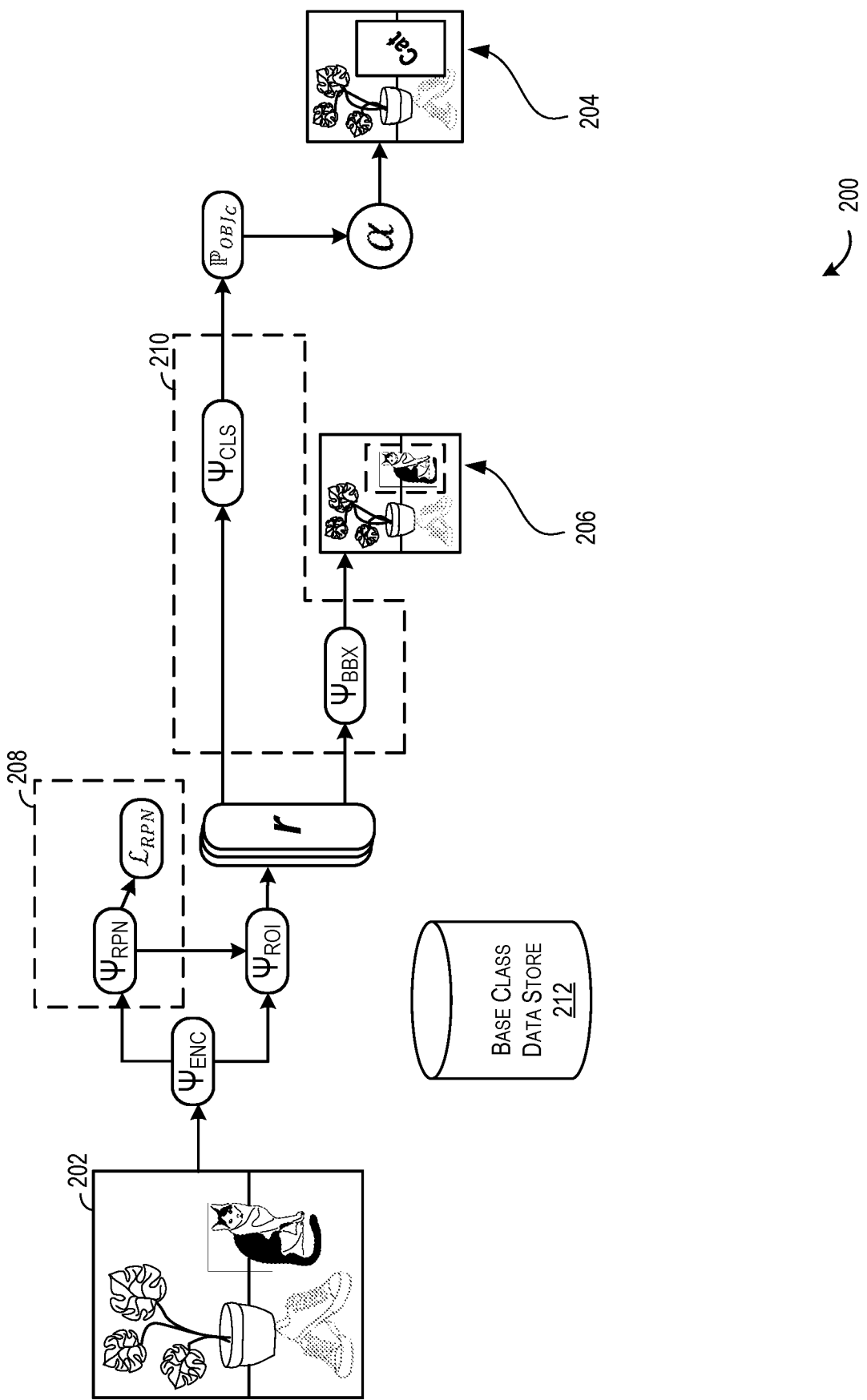
FIG. 2 illustrates a block diagram depicting an example of a conventional few-shot object detection (FSOD) framework.

FIG. 2 illustrates a block diagram depicting an example of a conventional few-shot object detection (FSOD) framework 200. FSOD framework 200 (an example of the object detection framework 104 of FIG. 1) may be a region based convolutional neural network that is configured to take an image I (e.g., image 202) as input and predict a classification object label (also referred to as a "label," a "classification object label," or a "classification") as depicted at 204. The label generated at 204 may include a single classification label for the object and/or a distribution of all possible classification labels with corresponding confidence scores indicating a likelihood the object depicted is a member of a given class. The FSOD framework 200 depicted in FIG. 2 is an example of a Faster Region-based Convolutional Neural Network (Faster R-CNN). The classification generated by this neural network can indicate an object of a particular type (e.g., a cat, a dog, a tree, a bucket, etc.) has been detected within the image I. In some cases, the FSOD framework 200 may predict bounding box dimensions and/or coordinates depicted at 206 that indicate a location of the object within the image I. The FSOD framework 200 has two neural networks: a region proposal network (labeled $\Psi_{RPN}$) and a second network to use the proposals generated by the region proposal network to detect objects. The second neural network can include a classifier (e.g., $\Psi_{CLS}$) and a regressor (e.g., $\Psi_{BBX}$).

The FSOD framework 200 can be summarized with the following computational pipeline:

$$\Psi_{OBJ_C}(\cdot) = \Psi_{CLS} \circ \Psi_{ROI} \circ \Psi_{RPN} \circ \Psi_{ENC}(\cdot) \quad (1)$$

$$\Psi_{OBJ_B}(\cdot) = \Psi_{BBX} \circ \Psi_{ROI} \circ \Psi_{RPN} \circ \Psi_{ENC}(\cdot) \quad (2)$$

where $\Psi_{ENC}$ is an image encoding backbone (e.g., a ResNet50 or ResNet101 backbone) that returns a convolutional feature map (e.g., fixed-length feature vectors derived from the image and mapped to various points of the image). $\Psi_{RPN}$ is part of a class-agnostic region proposal network (e.g., a first neural network) which is a fully convolutional network configured to generate region proposals utilizing a number of anchor boxes, with multiple anchor boxes of differing scales and/or aspect ratios existing for a single region.

Figure 3:
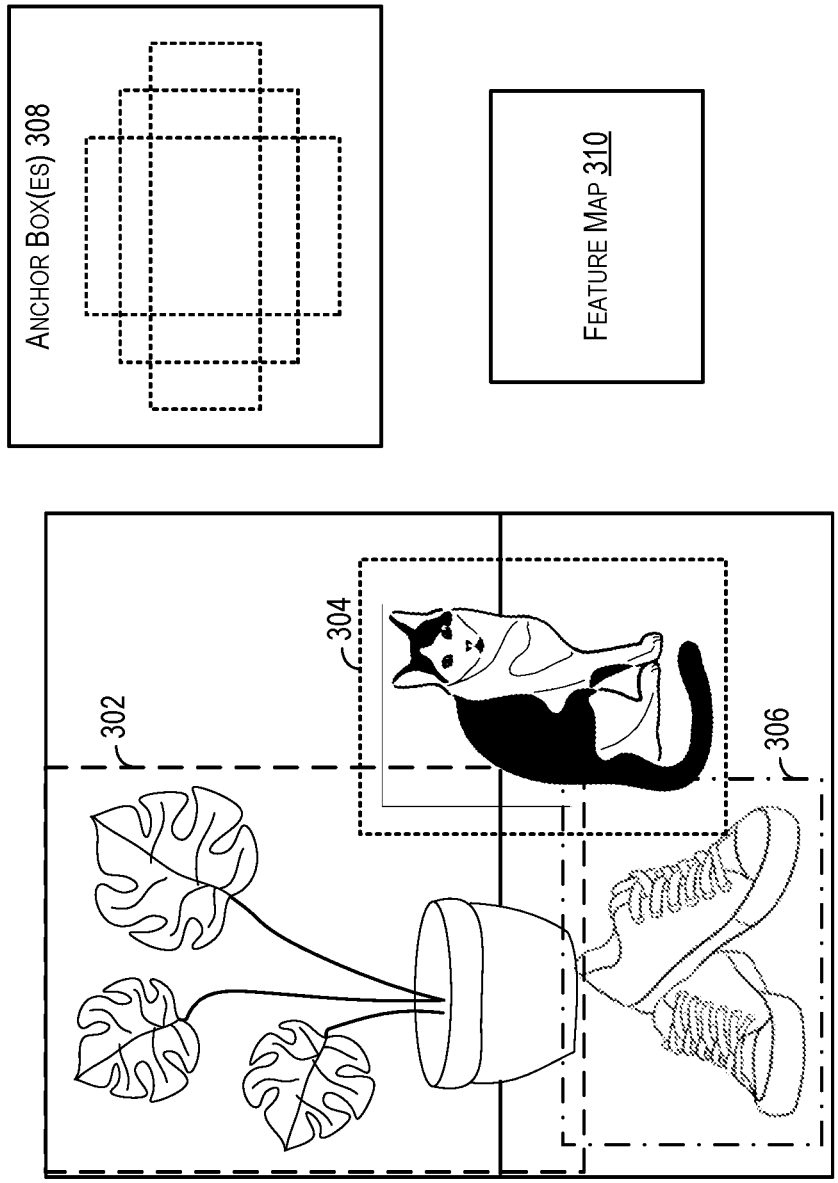
FIG. 3 provides a schematic illustration depicting a number of region proposals identified from an image, in accordance with at least one embodiment.

FIG. 3 provides a schematic illustration 300 depicting a number of region proposals (e.g., region proposal 302A, region proposal 302B, and region proposal 302C, collectively referred to as "region proposals 302") identified from an image, in accordance with at least one embodiment. The $\Psi_{RPN}$ of FIG. 2 identifies the region proposals using any suitable number of anchor boxes of predefined sizes and/or aspect ratios (e.g., anchor box(es) 308). The anchor box(es) 308 may be used at every anchor point of feature map 310 (e.g., a feature map generated by $\Psi_{ENC}$ of FIG. 2). Each point in the feature map 310 may be considered an anchor point. The anchor boxes may be positioned at each point of the feature map 310 of the image. Each anchor box may then be used to produce a prediction of whether it is in the foreground (or in other words, likely to include an object) or the background (or in other words, likely to not include an object).

To make such predictions, the $\Psi_{RPN}$ of FIG. 2 may utilize a distance metric to determine an extent of overlap of an anchor box with a known object. If the region overlaps with a ground truth image of an object (e.g., an image that is known to be a cat, a boat, a coffee mug, etc.) over a threshold degree (e.g., 80% overlap, 90% overlap, etc.), the region may be classified as being in the foreground, else, the region may be classified as being in the background. $\Psi_{RPN}$ of FIG. 2 may utilize a regression layer to optimize the coordinates of the bounding box to be precisely around the object depicted.

The loss function utilized for the $\Psi_{RPN}$ of FIG. 2 may utilize the sum of the classification and regression loss. The classification loss is the entropy loss on whether the image is a foreground or a background. The regression loss is the difference between the regression of the foreground box and that of the ground truth box.

$$\mathcal{L} = \mathcal{L}_{OBJ_C} + \mathcal{L}_{OBJ_B} + \mathcal{L}_{RPN} \quad (3)$$

Figure 4:
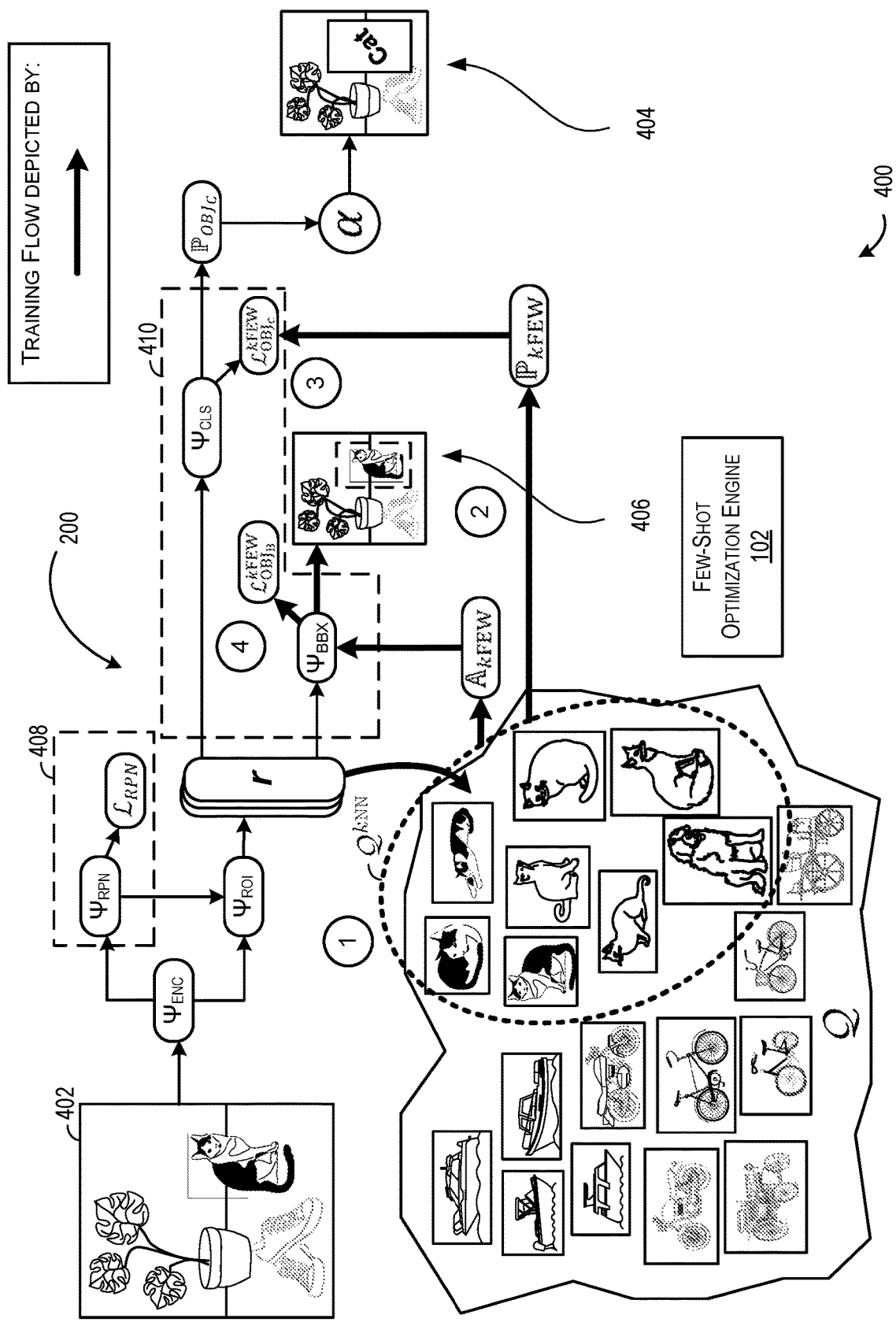
FIG. 4 illustrates a block diagram depicting an example training process for an improved few-shot object detection framework, in accordance with at least one embodiment.

FIG. 4 illustrates a block diagram depicting an example training process for an improved few-shot object detection framework (e.g., FSOD framework 400), in accordance with at least one embodiment. In some embodiments, FSOD framework 400 may include the components of FSOD framework 200 of FIG. 2. For example, network 408 may be an example of first neural network 208 of FIG. 2, the combination of classifier $\Psi_{CLS}$ and regressor $\Psi$BBX may be considered an example of the second neural network 210 of FIG. 2.

FSOD framework 400 can incorporate the use of a novel image set Q that includes relatively few ground-truth examples (e.g., less than 30, 40, 10, etc.) for each novel classification label. For example, novel image set 2, as depicted, includes 6 images of a cat, 1 image of a dog, 1 image of a fox, 4 images of boats, 2 images of motorcycles, 3 images of bicycles, and 2 images of carriages. The particular images, objects, and number of images are intended to be illustrative only. Each ground truth example of novel image set 2 may include a known classification and bounding box coordinates for the object depicted.

The method employed by the FSOD framework 300 can include the following. Let there be an image I (e.g., image 402), where $I \in \mathbb{R}^{w \times h \times 3}$, where w is the width of the image, h is the height, and 3 is used to denote three channels of the image (e.g., red, green, and blue channels). The objective of the FSOD framework 400 is to retrieve a list $\mathcal{Y} = \{y_i\}_{i=1}^N$ of object proposals where $y_i = (c_i, b_i)$ with $b_i \in [0, 1]^4$ representing the bounding box coordinates of the proposal with respect to an image space and $c_i \in C_{all}$ representing the target class, where $C_{all} = C_{base} \cup C_{novel}$ (e.g., the superset of the novel and base class categories). Class categories $C_{base}$ and $C_{novel}$ correspond to base classes which are heavily represented in the training set and novel classes, respectively, which are represented by the few-shot data support. Moreover, both class categories are non-overlapping, $C_{base} \cap C_{novel} = \emptyset$. The FSOD framework 200 (e.g., a faster R-CNN) can be summarized with the following computational pipeline:

$$\Psi_{OBJ_C}(\cdot) = \Psi_{CLS} \circ \Psi_{ROI} \circ \Psi_{RPN} \circ \Psi_{ENC}(\cdot) \quad (1)$$

$$\Psi_{OBJ_B}(\cdot) = \Psi_{BBX} \circ \Psi_{ROI} \circ \Psi_{RPN} \circ \Psi_{ENC}(\cdot) \quad (2)$$

As described in connection with FIG. 2, $\Psi_{ENC}$ is an image encoding backbone (e.g., a ResNet50 or ResNet101 backbone), $\Psi_{RPN}$ is a class agnostic RPN, $\Psi_{ROI}$ is a ROI feature encoder which link the proposals from $\Psi_{RPN}$ with the image encoding provided by $\Psi_{ENC}$. $\Psi_{CLS}$ and $\Psi_{BBX}$ represent classification and regression heads, respectively, which align the proposed regions of interest to a set of object classes and bounding boxes, respectively. The parameters of $\Psi_{ENC}$, $\Psi_{RPN}$, and $\Psi_{ROI}$ may be shared for both $\Psi_{OBJ_C}$ and $\Psi_{OBJ_B}$. Additionally, the entire ensemble is trained end-to-end with losses penalizing the RPN (for better background separation of the proposals and anchor refinement) and the classification/regression heads.

Thus, for the input image I, the model outputs a set of predictions that include the predicted object class and predicted bounding box coordinates (e.g., $\tilde{y} = (\Psi_{OBJ_C}(I), \Psi_{OBJ_B}(I))$). For the two-phase FSOD use case, first, the entire components may be trained using $C_{base}$ data (e.g., ground truth examples of base classifications $C_{base}$ obtained from the base class data store 212).

Next, a fine-tuning step is applied heads using $C_{novel}$ data using a subset of the novel image set Q (e.g., $Q^{kFEW}$, referred to as "kFEW" for ease). Instances of kFEW may be identified (e.g., by the few-shot optimization engine 102 of FIG. 1) as being within a threshold degree of similarity to the features of the proposed regions r). The few-shot optimization engine 102 may utilize a set of object instances $\mathcal{D} = \{d_1 \ldots d_M\}$, where $d_i \in \mathbb{R}^{w_i \times h_i \times 3}$, with attached class labels $\{c_1 \ldots c_M\}$ where $c_i \in C_{all}$. These can be image crops depicting the objects retrieved from the entire few-shot dataset used to train the model. They are used inside kFEW via their $\Psi_{ROI}$ feature encoder representation. $Q = \Psi_{ROI}(\mathcal{D})$, where $\Psi_{ROI}(\mathcal{D}) = \{\Psi_{ROI}(d_i) \ldots \Psi_{ROI}(d_M)\}$ may be considered to represent the feature store where k-NN operates. For ease of understanding, the set of novel images Q can be considered to include $\{q_i \ldots q_m\}$, where M represents the cardinality of the feature store.

At step 1, the few-shot optimization engine 102 may obtain the proposed regions of interest r (also referred to as "proposed regions" or "instances of proposed region data"). These proposed regions may be class-agnostic. Given a region proposal r E $\Psi_{RPN}$ (I) obtained as a result of the RPN from I, a distance measurement (e.g., a Euclidean distance) may be computed, $\delta = (\mathbb{R}^d, \mathbb{R}^d) \rightarrow \mathbb{R}$, between $\Psi_{RPN}(r)$ and every element from Q. For ease of notation, "r" may be used to denote $\Psi_{RPN}(r)$. The set $\{\delta(r,q) | \forall q \in Q\}$ can be obtained. Prior to applying the distance function $\delta$, the descriptors can be normalized using their l2 norm and the aggregated mean from set Q. As a result of the operations performed at 1 (also referred to as the "k-NN process), a list $Q^{kNN}$ of k nearest neighbors of a given r may be obtained, where $|Q^{kNN}|=k$, where k represents the number of retrieved neighbors. This list may be implicitly split in sub-lists $Q_{c_i}^{kNN}$ where $c_i \in C_{all}$, according to their class label.

At step 2, a probability distribution (e.g., $\mathbb{P}_{kFEW}$) may be built using the classes fo the retrieved neighbors list $Q^{kNN}$. In some embodiments, the probability distribution of the k-NN space may be conditioned by the set of class labels $C_{all}$. Thus, the probability distribution for region proposal r (a single region proposal from the set of region proposals) may be obtained with the following formula:

$$C_{all}|r \sim \left(\frac{c_1}{p(c_1|r)}, \frac{c_2}{p(c_2|r)}, \frac{c_3}{p(c_3|r)}, \ldots \frac{c_{|C_{all}|}}{p(c_{|C_{all}|}|r)}\right)$$

where probability $p(\cdot)$ is defined as:

$$p(c_i|r) = \frac{\sum_{q \in Q_{c_i}^{kNN}} \exp(-\delta\langle q, r\rangle/\tau)}{\sum_{c_j \in C_{all}} \sum_{q \in Q_{c_j}^{kNN}} \exp(-\delta\langle q, r\rangle/\tau)}$$

Parameter t represents the spread of the exponential factor inside the probability function and can be determined by validation. A higher value of t may produce a more flattened probability distribution. As a result of this operations, an array of resulting class probabilities for r is produced. This array (e.g., $\mathbb{P}_{kFEW}$) can be expressed $\mathbb{P}_{kFEW}=(p(c_1|r,p(c_1|r), \ldots p(c_{|C_{all}|}|r))$.

In some embodiments, a weighted average of all encoded feature representations for the nearest neighbors k selected from $Q^{kNN}$ can be computed with the following formula:

$$\mathbb{A}_{kFEW} = \frac{1}{|Q^{kNN}|} \sum_{q \in Q^{kNN}} \delta\langle q, r\rangle \cdot q$$

As provided in the above formula, the k nearest neighbors may be averaged and each feature representation may be weighted based at least in part on a distance measurement (e.g., a Euclidean distance) computed between the given corresponding novel image and the feature representation of the region proposal r.

At steps 3 and 4, the FSOD pipeline can be constrained using the previously computed information (e.g., $\mathbb{A}_{kFEW}$ amd $P_{kFEW}$). At step 3, the term $\mathbb{P}_{kFEW}$ can be used as a weighting factor via the negative log-likelihood los for the $\mathcal{L}_{OBJ_C}$ loss component. The objective of the loss component is to penalize the class information of the object proposals using the k-NN encoded information. Thus, a classifier (e.g., $\Psi_{CLS}$) which accommodates the kFEW strategy is penalized by the following weighted classification loss:

$$\mathcal{L}_{OBJ_C}^{kFEW} = (1+B \cdot \mathcal{L}_{NLL}(\mathbb{P}_{kFEW})) \cdot \mathcal{L}_{OBJ_C}$$

Where parameter $\beta \in [0, 1]$ represents a scaling factor to determine the impact of the retrieved k-NN conditional distribution and it can be determined by validation. The term $\mathcal{L}_{OBJ_C}^{kFEW}$ replaces the $\mathcal{L}_{OBJ_C}$ term from equation 3 discussed above in connection with FIG. 3.

At step 4, the encoded feature representation $\mathbb{A}_{kFEW}$ can be used as a weighted factor inside the regression head (e.g., $\Psi_{BBX}$) and thus $\Psi_{OBJ_B}^{kFEW}$ becomes:

$$\Psi_{OBJ_B}^{kFEW}(\cdot) = \Psi_{BBX} \circ ((1-\lambda)\mathbb{A}_{kFEW} + \lambda\Psi_{ROI}) \circ \Psi_{RPN} \circ \Psi_{ENC}(\cdot)$$

where parameter $\lambda \in [0, 1]$ is a linear interpolation term configured to weight the balance between original feature representation and the kFEW feature representation. In some embodiments, each of the encoded feature representations used to compute $\mathbb{A}_{kFEW}$ can be weighted based at least in part on the distance of the given feature representation to the feature representation of the region proposal r. It should be appreciated that steps 3 and 4 may be performed in any suitable order.

Figure 5:
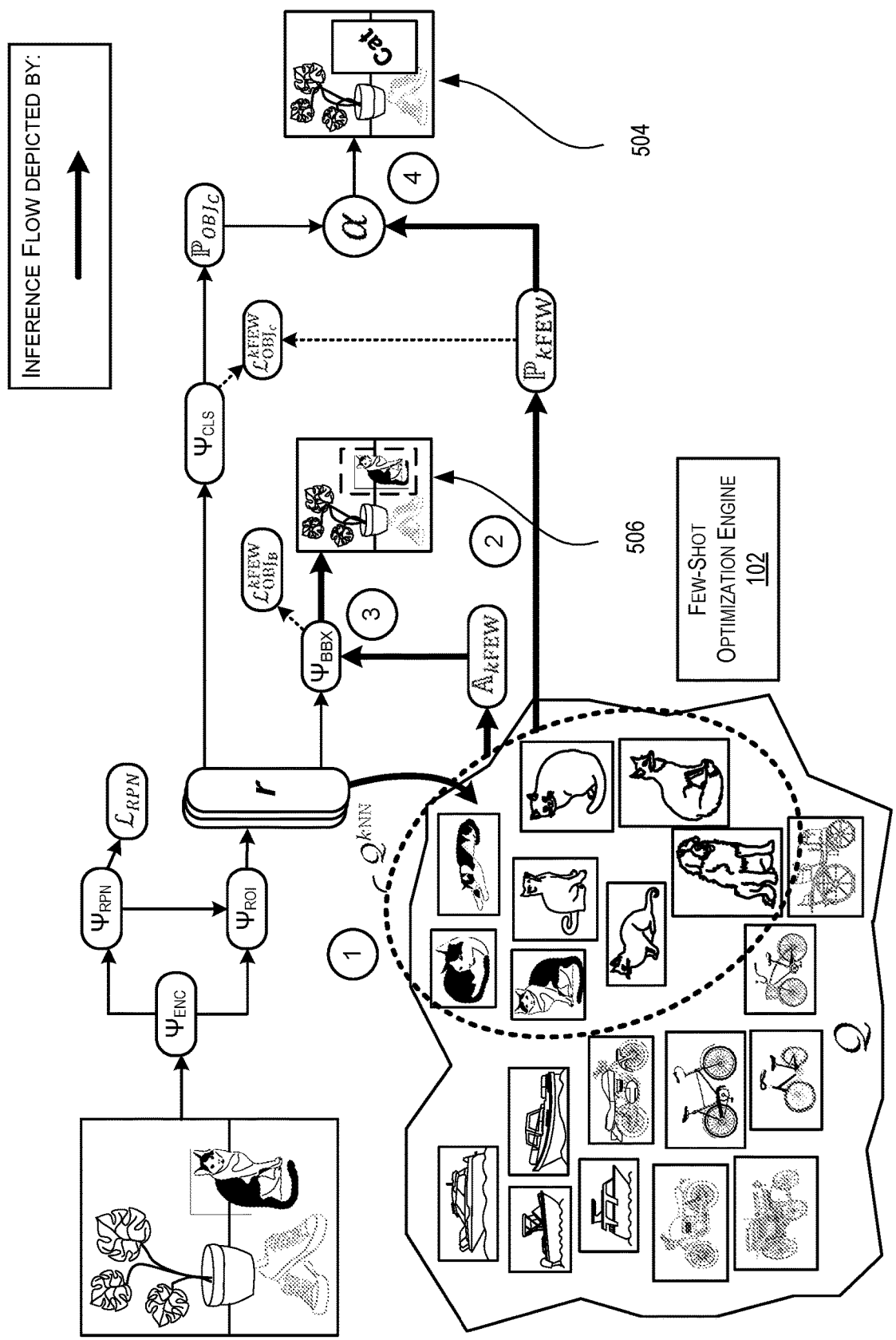
FIG. 5 illustrates a block diagram depicting an example of an optimized inference process for detecting one or more objects in an image, in accordance with at least one embodiment.

FIG. 5 illustrates a block diagram depicting an example of an optimized inference process 500 for detecting one or more objects in an image, in accordance with at least one embodiment. Few-shot object detection (FSOD) framework 500 may be an example of the FSOD framework 400 of FIG. 4.

Process 500 may be executed during inference time, the few-shot optimization engine 102 may be utilized to execute the operations of steps 1 and 2 described above in connection with FIG. 4. These operations are not duplicated here for brevity. Once $\mathbb{P}_{kFEW}$ and $\mathbb{A}_{kFEW}$ are generated/computed, the process 500 may proceed to step 3.

At step 3, $\mathbb{A}_{kFEW}$ can be used as a weighted factor inside the regression head (e.g., $\Psi_{BBX}$) to predict a bounding box (e.g., bounding box data 506, including dimensions and coordinates) for the object depicted in the proposed region using the following formula:

$$\Psi_{kFEW}(\cdot) = \Psi_{BBX} \circ ((1-\lambda)\mathbb{A}_{kFEW} + \lambda\Psi_{ROI}) \circ \Psi_{RPN} \circ \Psi_{ENC}(\cdot)$$

where parameter $\lambda \in [0, 1]$ is a linear interpolation term configured to weight the balance between original feature representation and the kFEW feature representation.

At step 4, having the predicted class distribution $\mathbb{P}_{OBJ_C}$ and the resulted conditional probability $\mathbb{P}_{kFEW}$, the following final classification (e.g., object type classification distribution) for the proposed region (e.g., classification label(s) 506 that include a single classification label for the object and/or a distribution of all classification labels with corresponding confidence scores indicating a likelihood the object depicted is a member of a given class) can be derived by:

$$\omega_{OBJ_C}^{kFEW} = (1-\alpha)\,\mathbb{P}_{kFEW} + \alpha\,\mathbb{P}_{OBJ_C}$$

where $\alpha \in [0, 1]$ is a linear interpolation term (e.g., the same inference term applied with $\mathbb{A}_{kFEW}$).

One advantage of FSOD framework 400, including the operations provided by few-shot optimization engine 102, is that it can be easily incorporated directly during inference time to influence the predicted class probabilities using the probability distribution derived from the retrieved k-NN space. Similarly, the weighted average of the similar images (e.g., the k nearest neighbors of the proposed region) found from the novel image set can be used to influence the bounding box attributes predicted by the CNN. Additionally, once incorporated, the techniques described in connection with FIGS. 4 and 5 can be immediately incorporated within any learning framework (e.g., FSOD framework 200) at the expense of no additional learning parameters.

Figure 6:
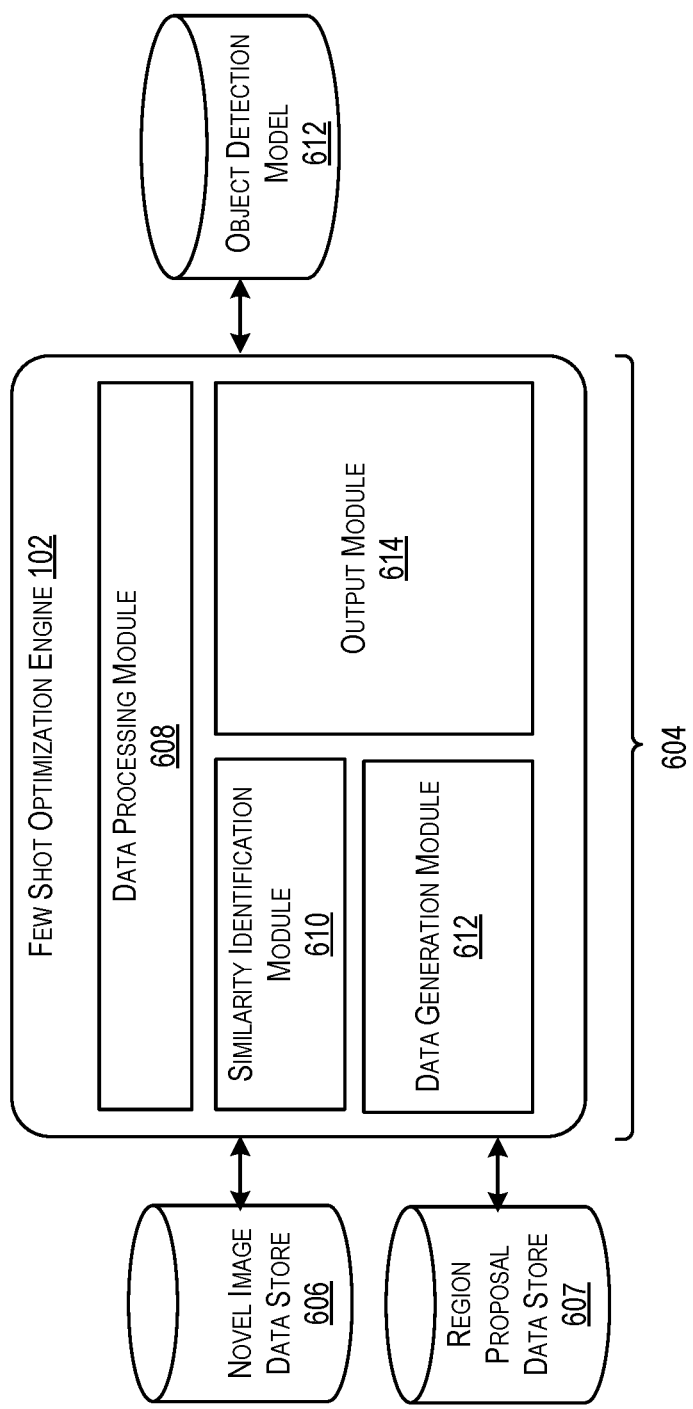
FIG. 6 is a schematic diagram of few-shot optimization engine, including a plurality of modules that may perform functions in accordance with at least one embodiment.

FIG. 6 is a schematic diagram of a few-shot optimization engine 600 (e.g., an example of few-shot optimization engine 102 of FIGS. 1, 4 and 5), including a plurality of modules 602 that may perform functions in accordance with at least one embodiment. The modules 604 may be software modules, hardware modules, or a combination thereof. If the modules 604 are software modules, the modules 604 can be embodied on a computer readable medium and processed by a processor in any of the computer systems described herein. It should be noted that any module or data store described herein, may be, in some embodiments, be a service responsible for managing data of the type required to make corresponding calculations. The modules 604, or some portion of the modules 604, may be operate at the service provider computer(s) 104 of FIG. 1, or the modules may operate as separate modules or services external to the service provider computer(s) 104 (e.g., as part of the object detection framework xxx of FIG. 1).

In the embodiment shown in the FIG. 6, a data store (e.g., novel image data store 606, region proposal data store 607) is shown, although data can be maintained, derived, or otherwise accessed from various data stores, either remote or local to the few-shot optimization engine 102, to achieve the functions described herein. The few-shot optimization engine 102, as shown in FIG. 6, includes various modules such as a data processing module 608, a similarity identification module 610, a data generation module 612, and an output module 614. Some functions of the modules 604 are described below. However, for the benefit of the reader, a brief, non-limiting description of each of the modules is provided in the following paragraphs.

In at least one embodiment, the few-shot optimization engine 102 includes the data processing module 608. Generally, the data processing module 608 may be utilized to receive any suitable information with respect to any example provided herein. The data processing module 608 may include any suitable number of application programming interfaces with which the functionality of the few-shot optimization engine 102 may be invoked. By way of example, the data processing module 608 may receive (e.g., via an API) any suitable data from any suitable source.

Additionally, the data processing module 608 may be configured to invoke the functionality provided by any suitable combination of the remaining modules of the modules 608. By way of example, the data processing module 608 may be configured to receive any suitable data and provide the received data to any other module of the modules 604. By way of example, the data processing module 608 may receive any suitable number of region proposals (e.g., region of interest proposals r of FIGS. 4 and 5, individually being instances of proposed region data). A region proposal can include a feature representation of the region, bounding box data (e.g., dimensions and/or coordinates of the bounding box), one or more classification label(s) indicating a likelihood the region depicts a particular object corresponding to a given classification label, and the like. In some embodiments, the data processing module 608 may receive and store the region proposal data within region proposal data store 607. In some embodiments, the data processing module 608 may pass an identifier and/or the region proposal data to any other module of the modules 604 to invoke their corresponding functionality.

In at least one embodiment, the few-shot optimization engine 102 includes the similarity identification module 610. The similarity identification module 610 may be configured to receive proposed region data from data processing module 608 and/or the similarity identification module 610 may retrieve the proposed region data from region proposal data store 607 (e.g., in some cases, based at least in part on an identifier associated with the region proposal(s) and provided by the data processing module).

In some embodiments, the similarity identification module 610 may be configured to identify, from a novel image set (e.g., a novel image set stored in novel image data store 606), a number of novel images that are similar to each proposed region. The novel image set stored within novel image data store 606 may include any suitable number of examples (e.g., less than 30 (or 40, or 20, etc.) images for each unique classification label represented in the novel image set). In some embodiments, each image of the novel image set may be associated with a known classification label. In some cases, the images of the novel image set may individually be associated with bounding box coordinates indicating a location, within the image, of an object corresponding to the classification label. To identify the similar images (e.g., k nearest neighbors of the proposed region, denoted kFEW as described above in connection with FIGS. 4 and 5), the similarity identification module 610 may be configured to pair the proposed region data with each novel image of the novel image set to calculate a distance measurement (e.g., a Euclidean distance) between the pairing of the feature representations of each novel image and the feature representation corresponding to the proposed region (e.g., an instance of proposed region data). The similarity identification module 610 may be configured to assess whether the degree of similarity as provided by the distance measurement exceeds a threshold value indicating a degree of similarity (e.g., indicating the novel image and the proposed region overlap by over a threshold amount). If the distance measurement exceeds the threshold value, the similarity identification module 610 may add the novel image to the set kFEW, to indicate that the novel image is one of a set of images (kFEW) deemed to be similar to the proposed region. The set kFEW can be stored in any suitable data store (e.g., region proposal data store 607) and/or the set of kFEW (e.g., k nearest neighbors of the proposed region) may be passed to the data generation module 612.

In at least one embodiment, the few-shot optimization engine 102 includes the data generation module 612. The data generation module 612 can be configured to generate a probability distribution of classification labels (e.g., probability distribution 124 of FIG. 1) based at least in part on the similar images identified by the similarity identification module 610. By way of example, the number of similar images identified from the novel image set that are associated with the same classification label may be divided by the total number of similar images identified to identify a value quantifying a probability that an image from the similar images identified is associated with a particular classification label. The same operations can be applied to each unique classification label associated with the similar images identified from the novel image set.

In some embodiments, the data generation module 612 may generate a weighted average of corresponding feature representations (e.g., weighted feature data 128) for the images identified as being similar to the instant proposed region by the similarity identification module 610. In some embodiments, the distance between the feature representation of a given and the instance proposed region may be utilized as the weight in computing the weighted feature data. That is, the closer in distance of the feature representation of a given similar image to the feature representation of the region proposal, the higher the weight applied to that feature representation when computing the average of the feature representations of the similar images. This enables similar images that have a higher degree of similarity to given region proposal features to be weighted more heavily than similar images with features that are less similar.

In at least one embodiment, the few-shot optimization engine 102 includes the output module 614. The output module 614 may be configured to execute operations to cause a neural network (e.g., CNN 108, an example of neural network 410 and neural network 510 of FIGS. 1, 4, and 5, respectively) to utilize the weighted feature data and/or the probability distribution generated by the data generations module 612 as input. By way of example, the output module 614 may provide input data including the weighted feature data and/or the probability distribution that may be used as input to the CNN (e.g., neural network 410) (or may be provided to the CNN directly). The CNN (e.g., a regressor of the CNN such as $\Psi_{BBX}$ of FIGS. 4 and 5) may utilize any suitable combination of the data provided by the output module 614 (e.g., the weighted feature data) to identify bounding box dimensions and/or coordinates. The output of the CNN (e.g., a classifier of the CNN such as $\Psi_{CLS}$ of FIGS. 4 and 5) may be utilized with the probability distribution to derive a final classification (e.g., object type classification distribution) for the proposed region (e.g., classification label(s) 504 that include a single classification label for the object and/or a distribution of all classification labels with corresponding confidence scores indicating a likelihood the object depicted is a member of a given class) can be derived by:

$$\Psi_{OBJ_C}{}^{kFEW}=(1-\alpha)\,\mathbb{P}_{kFEW}+\alpha\,\mathbb{P}_{OBJ_C}$$

where $\alpha \in [0, 1]$ is a linear interpolation term (e.g., the same inference term applied with $\mathbb{A}_{kFEW}$).

Figure 7:
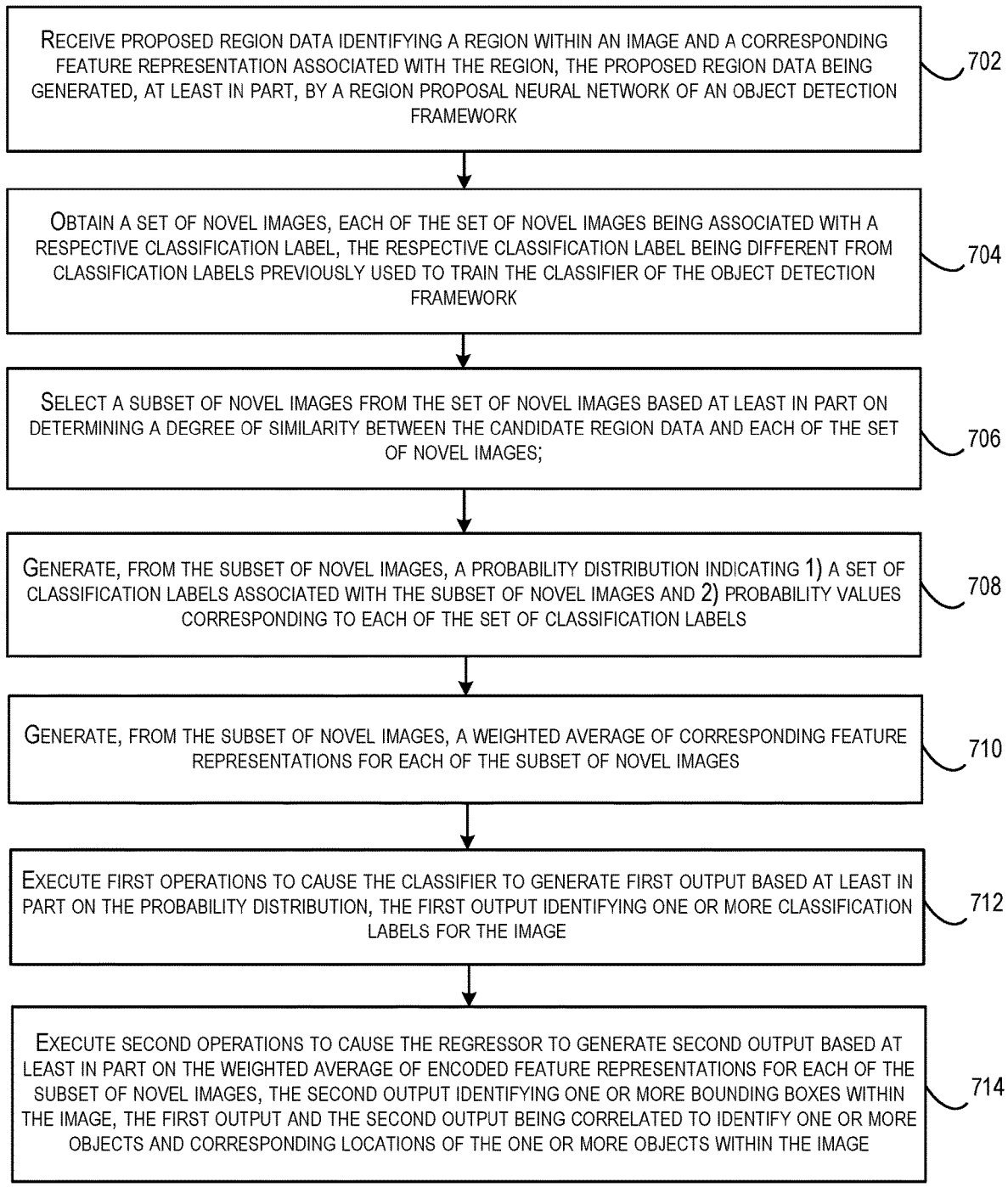
FIG. 7 includes a flowchart illustrating an example method for optimizing object detection functionality of a few-shot object detection framework, in accordance with at least one embodiment.

FIG. 7 includes a flowchart illustrating an example method 700 for optimizing a few-shot object detection framework, in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by a computing system comprising the few-shot optimization engine 102 of FIG. 1 which may operate in whole or in part on a user device and/or the service provider computer(s) 104 of FIG. 1). In some embodiments, the method 700 may be performed by the few-shot optimization engine 102 of FIGS. 1, 4, 5, and/or the few-shot optimization engine 600 of FIG. 6.

The method 700 may begin at block 702, where proposed region data (e.g., region data corresponding to region 304 of FIG. 3, a region depicting a cat) may be received. The proposed region data (e.g., an instance of proposed region data corresponding to a single proposed region) may identify a region within an image and a corresponding feature representation associated with the region. In some embodiments, the proposed region data may be generated, at least in part, by a region proposal neural network (RPN) of an object detection framework (e.g., $\Psi_{RPN}$ of FSOD framework 400 and/or 500 of FIGS. 4 and 5, respectively). In some embodiments, these region proposals generated by the RPN may be pooled with feature representations generated from an image (e.g., image 402 of FIG. 4 by the $\Psi$ENC). The object detection framework may comprise the region proposal neural network $\Psi_{RPN}$ and a convolutional neural network that comprises a classifier (e.g., $\Psi_{CLS}$ of FIGS. 4 and 5) and a regressor (e.g., $\Psi_{BBX}$ of FIGS. 4 and 5).

At 704, a set of novel images may be obtained (e.g., novel image set 2 of FIGS. 4 and 5). In some embodiments, each of the set of novel images being associated with a respective classification label. The respective classification label may be different from classification labels previously used to train the classifier of the object detection framework.

At 706, a subset of novel images may be selected (e.g., by the similarity module 610 of FIG. 6) from the set of novel images based at least in part on determining a degree of similarity between the candidate region data and each of the set of novel images. The degree of similarity may be identified based at least in part on calculating a distance measurement (e.g., a Euclidean distance) between the proposed region data and each of the set of novel images.

At 708, a probability distribution may be generated (e.g., by the data generation module 612 of FIG. 6) from the subset of novel images. In some embodiments, the probability distribution indicates: 1) a set of classification labels associated with the subset of novel images and 2) probability values corresponding to each of the set of classification labels.

At 710, a weighted average of corresponding feature representations for each of the subset of novel images may be generated (e.g., by the data generation module 612 of FIG. 6) from the subset of novel images. In some embodiments, the weighted average may be weighted according to the probability distribution such that features corresponding to classification labels with higher probability values are weighted higher than those corresponding to classification labels with lower probability values.

At 712, first operations may be executed (e.g., by the output module 614 of FIG. 6) to cause the classifier to generate first output based at least in part on the probability distribution. In some embodiments, the first output identifies one or more classification labels for the image. By way of example, the output module 614 may provide the proposed region data to the classifier $\Psi_{CLS}$ of FIG. 4. The probability distribution may be utilized with the loss function during the training stage of $\Psi_{CLS}$. During the inference stage, the probability distribution can be utilized with output of the $\Psi_{CLS}$ and a linear interpolation algorithm to adjust the probability distribution provided by the $\Psi_{CLS}$ toward the labels identified in the probability distribution generated by the data generation module 612.

At 712, second operations may be executed (e.g., by the output module 614) to cause the regressor $\Psi$BBX to generate second output based at least in part on the weighted average of encoded feature representations for each of the subset of novel images. In some embodiments, the second output identifies one or more bounding boxes (e.g., bounding box dimensions and/or coordinates) within the image, the first output and the second output being correlated to identify one or more objects and corresponding locations of the one or more objects within the image. During the training and inference stages of $\Psi_{BBX}$, the weighted average ($\mathbb{A}_{kFEW}$) may be utilized with the loss function to bias the output of $\Psi_{BBX}$ toward the features of $\mathbb{A}_{kFEW}$.

As a non-limiting example, referring to FIG. 4, an image 402 may be received. As depicted image 402 includes a plant, a pair of shoes, and a cat. Image 402 can be provided to $\Psi_{ENC}$ which is configured to generate a feature embedding and/or feature map of the image. The image 402 can be provided to RPN. $\Psi_{RPN}$ may be a region proposal neural network previously trained to identify one or more region proposals (e.g., instances of proposed region data) using any suitable number of anchors as described above in connection with FIGS. 2 and 3. The proposed regions (e.g., regions predicted to be in the foreground/to include an object) may be provided to $\Psi_{ROI}$. $\Psi_{ROI}$ may be a pooling layer that matches the proposed regions to the corresponding feature representations and/or portion of the feature map. The resulting paid of region/feature representation may be considered an instance of proposed region data (also referred to as a region of interest or candidate region data).

In at least one embodiment, the set of region proposals may include a region corresponding to the plant, a region corresponding to the shoes, and a region corresponding to the cat obtained from image 402. Each region proposal r may be used to determine a number of k nearest neighbors from the set 2 of FIG. 4. A distance measurement (e.g., a Euclidean distance) may be computed between r and each of the images from set 2. Based on these distance measurements, the subset of images $Q^{kNN}$ may be determined. As depicted, the subset of images includes several images of cats, an image of a dog, and an image of a fox. From the subset of images $Q^{kNN}$, $\mathbb{A}_{kFEW}$ and $\mathbb{P}_{kFEW}$ may be calculated. $\mathbb{A}_{kFEW}$ can be used to constrain $\Psi_{BBX}$ and $\mathbb{P}$ kFEW can be used to constrain $\Psi_{CLS}$ using the respective loss functions described above in connection with FIG. 4.

At inference time, $\mathbb{A}_{kFEW}$ and $\mathbb{P}_{kFEW}$ may be individually used with an interpolation algorithm and the output provided by $\Psi_{BBX}$ and $\Psi_{CLS}$, respectively, to influence the respective outputs of $\Psi_{BBX}$ and $\Psi_{CLS}$ toward the features and/or classification labels provided by the subset of images $Q^{kNN}$. In the example depicted in FIG. 5, the bounding box attributes provided by $\Psi$BBX may be influenced by the feature representations (e.g., a weighted average $\mathbb{A}_{kFEW}$) of the subset of images $Q^{kNN}$. $\mathbb{P}_{kFEW}$ can be used with the output of $\Psi_{BBX}$ (e.g., $\mathbb{P}_{OBJ_C}$) to influence the classification label(s) and/or confidence scores assigned by $\Psi_{CLS}$ (e.g., the "cat" label/classification depicted at 504).

Figure 8:
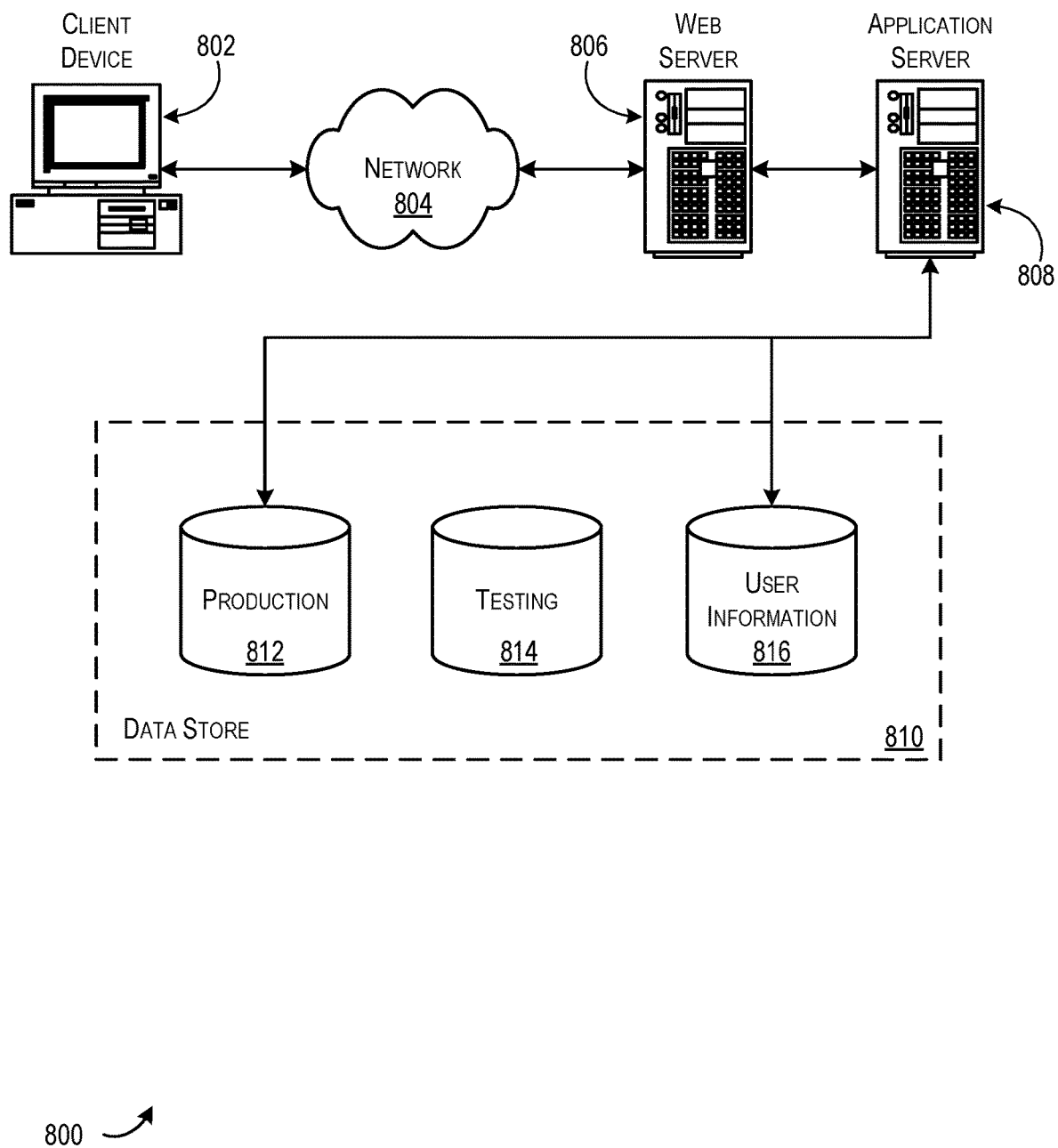
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes a user device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements and figures in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device, proposed region data identifying a region within an image and a corresponding feature representation associated with the region, the proposed region data being generated, at least in part, by a region proposal neural network of an object detection framework, the object detection framework comprising the region proposal neural network and a convolutional neural network that comprises a classifier and a regressor;
   obtaining a set of novel images, each of the set of novel images being associated with a respective classification label, the respective classification label being different from classification labels previously used to train the classifier of the object detection framework;
   selecting a subset of novel images from the set of novel images based at least in part on determining a degree of similarity between the proposed region data and each of the set of novel images;
   generating, from the subset of novel images, a probability distribution indicating 1) a set of classification labels associated with the subset of novel images and 2) probability values corresponding to each of the set of classification labels;
   generating, from the subset of novel images, a weighted average of corresponding feature representations for each of the subset of novel images;
   executing first operations to cause the classifier to generate first output based at least in part on the probability distribution, the first output identifying one or more classification labels for the image; and
   executing second operations to cause the regressor to generate second output based at least in part on the weighted average of the corresponding feature representations for each of the subset of novel images, the second output identifying one or more bounding boxes within the image, the first output and the second output being correlated to identify one or more objects and corresponding locations of the one or more objects within the image.

2. The computer-implemented method of claim 1, wherein the region proposal neural network is a first neural network of the object detection framework and wherein the classifier and the regressor are part of a second neural network of the object detection framework.

3. The computer-implemented method of claim 2, wherein the first neural network and the second neural network share at least one convolutional layer.

4. The computer-implemented method of claim 1, wherein executing the first operations comprises modifying a loss function associated with the classifier to utilize the probability distribution generated for the subset of novel images.

5. The computer-implemented method of claim 1, wherein executing the second operations comprises modifying a loss function associated with the regressor to utilize the weighted average of the corresponding feature representations for each of the subset of novel images.

6. A computing device, comprising:
one or more processors; and
a memory storing executable instructions that, upon execution by the one or more processors, cause the computing device to execute operations to cause the computing device to, at least:
obtain, from a first neural network of an object detection system, a plurality of region proposals identified from respective regions of an image;
obtain a set of images, each of the set of images being associated with a respective label, the set of images being different from the image;
select a subset of images from the set of images based at least in part on determining a degree of similarity between the image and each of the set of images;
generate, from the subset of images, a probability distribution indicating 1) a set of labels associated with the subset of images and 2) probability values corresponding to each of the set of labels, a probability values indicating a probability that a corresponding image depicts an object associated with a corresponding label; and
execute operations to cause output to be generated based at least in part on a second neural network, the plurality of region proposals, and the probability distribution, the output of the second neural network indicating a set of predicted labels associated with the plurality of region proposals, at least one of the set of predicted labels indicating a respective object of a plurality of possible objects.

7. The computing device of claim 6, wherein executing the operations to cause the output to be generated comprises i) providing the region proposals to the second neural network to generate a second probability distribution and ii) modifying the second probability distribution based at least in part on the probability distribution and a liner interpolation algorithm.

8. The computing device of claim 6, wherein executing the operations to cause the output to be generated further comprises providing, to a classifier of the second neural network, the region proposals and the probability distribution as training data, the classifier being trained utilizing proposed regions and a loss function that utilizes the probability distribution.

9. The computing device of claim 6, wherein executing the operations to select the subset of images from the set of images causes the computing device to calculate, between a corresponding proposed region and each of the set of images, a distance measurement quantifying a corresponding degree of similarity between a given proposed region and a given image of the set of images.

10. The computing device of claim 6, wherein executing the operations further cause the computing device to:
generate, from the subset of images, a weighted average of feature representations individually corresponding to a respective image of the subset of images; and
execute additional operations to cause a component of the second neural network to generate additional output based at least in part on the weighted average of the feature representations, the additional output identifying one or more bounding boxes within the image, the output and the additional output being correlated to identify the one or more objects and corresponding locations of the one or more objects within the image.

11. The computing device of claim 10, wherein the component of the second neural network is previously trained with data different from the weighted average of the feature representations.

12. A non-transitory computer-readable storage medium storing computer-executable instructions that, when executed by one or more processors of a computing device, cause the computing device to:
obtain, from a first neural network of an object detection system, a plurality of region proposals identified from respective regions of an image, the first neural network being trained to propose regions within respective input images, the first neural network being trained based at least in part on a first set of images;
obtain a second set of images, each of the second set of images being associated with a respective label, the second set of images being different from the first set of images;
select a subset of images from the second set of images based at least in part on determining a degree of similarity between the image and each of the second set of images;
generate a set of feature representations corresponding to the subset of images;
generate, from the subset of images, a weighted average of the set of feature representations corresponding to the subset of images; and
execute operations to cause a second neural network to generate output based at least in part on the weighted average of the set of feature representations corresponding to the subset of images, the output of the second neural network indicating a set of predicted bounding boxes corresponding to objects identified within the image.

13. The non-transitory computer-readable storage medium of claim 12, wherein causing the second neural network to generate the output comprises providing the region proposals and the weighted average of the set of feature representations as input, the second neural network being previously trained with data different from the weighted average of the set of feature representations.

14. The non-transitory computer-readable storage medium of claim 12, wherein executing the operations to cause the second neural network to generate the output based at least in part on the plurality of region proposals and the weighted average of the set of feature representations further comprises providing, to a regressor of the second neural network, the region proposals and the weighted average of the set of feature representations as training data, the regressor being trained utilizing the region proposals and a loss function that utilizes the weighted average of the set of feature representations.

15. The non-transitory computer-readable storage medium of claim 12, wherein executing the operations further cause the computing device to:
generate, from the subset of images, a probability distribution indicating probability values corresponding to a set of output labels, the probability values indicating a probability that a corresponding image of the subset of images depicts an object associated with a corresponding label of the set of output labels; and execute additional operations to cause a component of the second neural network to generate additional output based at least in part on the probability distribution, the additional output identifying a corresponding probability that a proposed region depicts a respective object corresponding to a classification label, the output and the additional output being correlated to identify one or more objects and corresponding locations of the one or more objects within the image.

16. The non-transitory computer-readable storage medium of claim 15, wherein the component of the second neural network is previously trained with data different from the probability distribution.

17. The non-transitory computer-readable storage medium of claim 12, wherein executing the operations further causes the computing device to:
generate, from the subset of images, a first probability distribution indicating probability values corresponding to a set of output labels, the probability values indicating a probability that a corresponding image of the subset of images depicts an object associated with a corresponding label of the set of output labels;
provide, to a component of the second neural network, the region proposals to obtain a second probability distribution; and
modify the second probability distribution based at least in part on the probability values of the first probability distribution.

18. The non-transitory computer-readable storage medium of claim 12, wherein executing the operations to select the subset of images from the second set of images causes the computing device to calculate, between a corresponding proposed region and each of the second set of images, a Euclidean distance measurement between the proposed region and a given image of the second set of images.

19. The computing device of claim 10, wherein the weighted average of the feature representations is weighted based at least in part on the distance measurement quantifying the degree of similarity between the proposed region and the given image.

20. The computing device of claim 19, wherein executing the operations to cause the output to be generated further comprises providing, to a component of the second neural network, the region proposals and the weighted average of the feature representations as training data, the component of the second neural network being trained utilizing the region proposals and a loss function that utilizes the weighted average of the feature representations.

* * * * *